Sept. 17, 1963  A. W. ANDERSON  3,103,772
CIGAR PACKAGING MACHINES
Filed March 22, 1961  14 Sheets-Sheet 1

INVENTOR.
ANDREW W. ANDERSON
BY
ATTORNEY

Sept. 17, 1963

A. W. ANDERSON 3,103,772

CIGAR PACKAGING MACHINES

Filed March 22, 1961

INVENTOR.
ANDREW W. ANDERSON
BY
Luther W Hawley
ATTORNEY

Sept. 17, 1963

A. W. ANDERSON 3,103,772

CIGAR PACKAGING MACHINES

Filed March 22, 1961

INVENTOR.
ANDREW W. ANDERSON
BY
[signature]
ATTORNEY

Sept. 17, 1963  A. W. ANDERSON  3,103,772
CIGAR PACKAGING MACHINES
Filed March 22, 1961  14 Sheets-Sheet 9

INVENTOR.
ANDREW W. ANDERSON
BY
ATTORNEY

Sept. 17, 1963 A. W. ANDERSON 3,103,772
CIGAR PACKAGING MACHINES
Filed March 22, 1961 14 Sheets-Sheet 13

INVENTOR.
ANDREW W. ANDERSON
BY
Arthur W Hawley
ATTORNEY

United States Patent Office 3,103,772
Patented Sept. 17, 1963

3,103,772
CIGAR PACKAGING MACHINES
Andrew W. Anderson, West Caldwell, N.J., assignor to Scandia Packaging Machinery Company, North Arlington, N.J., a corporation of New Jersey
Filed Mar. 22, 1961, Ser. No. 97,651
6 Claims. (Cl. 53—192)

This invention relates to a machine for feeding and packaging cigars.

The invention has for its salient object to provide a machine for efficiently feeding and packaging cigars in such a manner that the cigars will not be damaged by bending or distortion during their passage through the machine.

Another object of the invention is to so control the operation of the cigar packaging machine that it will operate only when the desired or predetermined number of cigars has been fed to the packaging mechanism.

Another object of the invention is to provide a machine of the character described having feed belts for feeding the cigars, means for feeding the cigars received from the feed belts to mandrels, and control means for the operation of the last named feeding means.

Another object of the invention is to provide a machine of the character described having feed belts for feeding the cigars, pushing mechanism for pushing the cigars into feeding position on the feed belts, and control means for controlling the operation of the pushing mechanism in such a manner as to insure the feeding of the cigars from the hopper to the belts.

Further objects of the invention will appear from the following specification taken in connection with the drawings which form a part of this application, and in which

FIG. 18 is a plan view of the folded carton with the cigars positioned therein;

The invention, briefly described, consists of a machine for packaging cigars, in which mechanism is provided for feeding the cigars from a hopper between a pair of belts by which they are conveyed to a platform or support. Pusher mechanism is provided for pushing the cigars from the support into mandrels which are carried by endless conveyors. A box blank is fed into the path of movement of the mandrels and as the mandrels are fed by the conveyors the blanks are folded around the mandrels and folding mechanism is provided for closing and sealing the boxes around the ends of the package.

Means is provided throughout the operation of the machine to prevent the cigars from being bent or broken and one such means operates to momentarily reverse the feeding movement of the belts when the cigars have been fed to the platform and during the pusher movement which feeds the cigars from the platform to the mandrels. Means is also provided for insuring the delivery of the cigars from the hopper to the belts, for pressing the cigars downwardly into the mandrels, and for ejecting the cartons and contents thereof from the mandrels, the cartons and contents being thereafter fed through suitable wrapping mechanism which wraps the completed package.

Further details of the invention will appear from the following description.

Since the packaging machine includes a plurality of mechanisms and operations, the various operations will be listed below and in connection with each operation the figures of the drawings which illustrate the mechanisms for carrying out the operations will be listed:

I. Pusher feed from hopper to feed belts—FIGS. 2, 3, 4, 5 and 6.
II. Belt feed for cigars—FIGS. 2, 3, 7, 8, 9 and 10.
III. Pusher for feeding cigars from platform to mandrels—FIGS. 2, 3, 11, 12 and 13.
IV. Mandrel operation and feed—FIGS. 14, 15, 16, 22, 23, 26, 27, 28 and 29.
V. Blank feed—FIGS. 14, 19, 20 and 21.
VI. Stripper mechanism for stripping cartons and contents from mandrels—FIGS. 22, 23, 24, 25, 26 and 27.
VII. Folding mechanism for folding cartons around mandrels and contents—FIGS. 14, 15, 16 and 30 to 35 inclusive.

The following specification will describe the various operations, in general, in the order above given.

*Pusher Feed From Hopper*

Attention is directed to FIGS. 2, 3, 4, 5 and 6, wherein there is shown a hopper H in which the cigars are stacked in rows, one above the other. The hopper walls are slotted at the bottom and the cigars rest on a base or platform 40 at the bottom of the hopper. At one side of the hopper, above a platform 41, are mounted a pair of belts 42 and 43, and the cigars are fed from the hopper between the lower lap 42A of the belt 42 and the upper lap 43A of the belt 43, and as these belts are operated in the manner hereinafter described, the cigars are fed.

The cigars are fed between the laps 42A and 43A by means of a plunger 45 having a front end 46 which engages the row of cigars at the bottom of the hopper and the plunger moves through the slots in the bottom of the hopper walls.

The plunger 45 has a top wall or cover 47 which holds the row of cigars above the row being fed during the plunger operation to feed the bottom row.

The rear end of the plunger 45 is pivoted at 48 to a link 49 which is connected to a crank 50 on a shaft 51. This shaft has a sprocket 52 which is driven by a chain 53 from a shaft 54, which in turn is connected by a bevel gear 55 and a bevel gear 56 to a shaft 57 which extends across the machine. The shaft 57 is driven from a suitable source of power, preferably indirectly from the power drive on the wrapping machine to which the packaged cigars are fed from the machine covered by this application.

Means is provided for controlling the operation of the feed plunger 45 in such a manner that cigars will be fed to the belt only when no cigars are present between the laps 42A and 43A or the portions of these laps opposite the hopper. This control is maintained by the structure shown particularly in FIGS. 5 and 6.

Figures 5, 6:
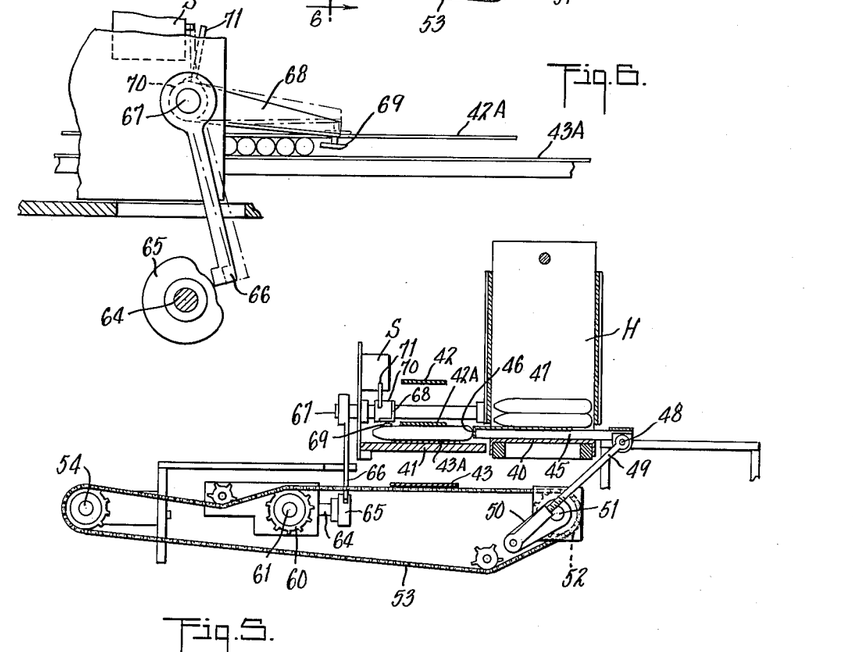
FIG. 5 is a view similar to FIG. 4 but showing the pusher mechanism in its operative position and the cigars fed to the feed belts.
FIG. 6 is a vertical sectional elevation taken substantially on line 6—6 of FIG. 4, looking in the direction of the arrows, this view being taken on an enlarged scale.

The chain 53, in addition to driving the shaft 51, also drives a sprocket wheel 60 mounted on a shaft 61. The shaft 61 is connected by bevel gears 62 and 63 to a shaft 64. Shaft 64 has secured thereto a cam 65, which is engaged by an arm 66 mounted on a spindle 67 to which is also secured an arm 68 having on the outer end thereof and extending downwardly therefrom, a plate 69. This plate, as shown particularly in FIGS. 5 and 6, rests on the outer ends of the cigars fed between the belt laps 42A and 43A. The arms 66 and 68 extend outwardly from a hub 70 on the spindle 67, and a switch arm 71 extends upwardly from the hub 70 and coacts with a micro-switch S to control the operation of the plunger 45. When cigars are present between laps of the belt, the arm 68 will be elevated and the plunger will not operate. However, when no cigars are present, the arm 68 will be depressed, as shown in FIG. 6, and the arm 66 will enter a notch in the cam, thus permitting the switch arm 71 to move to the position shown in FIG. 6, opening the switch. When the switch is opened, suitable clutch mechanism controlled by the switch will connect the driving connections for the plunger 45 and cause the plunger to operate and feed the cigars between the belt laps. This particular clutch control and feeler mechanism forms no part of the present invention and, therefore, has not been illustrated in further detail.

*Belt Feed*

Figures 1, 1A:
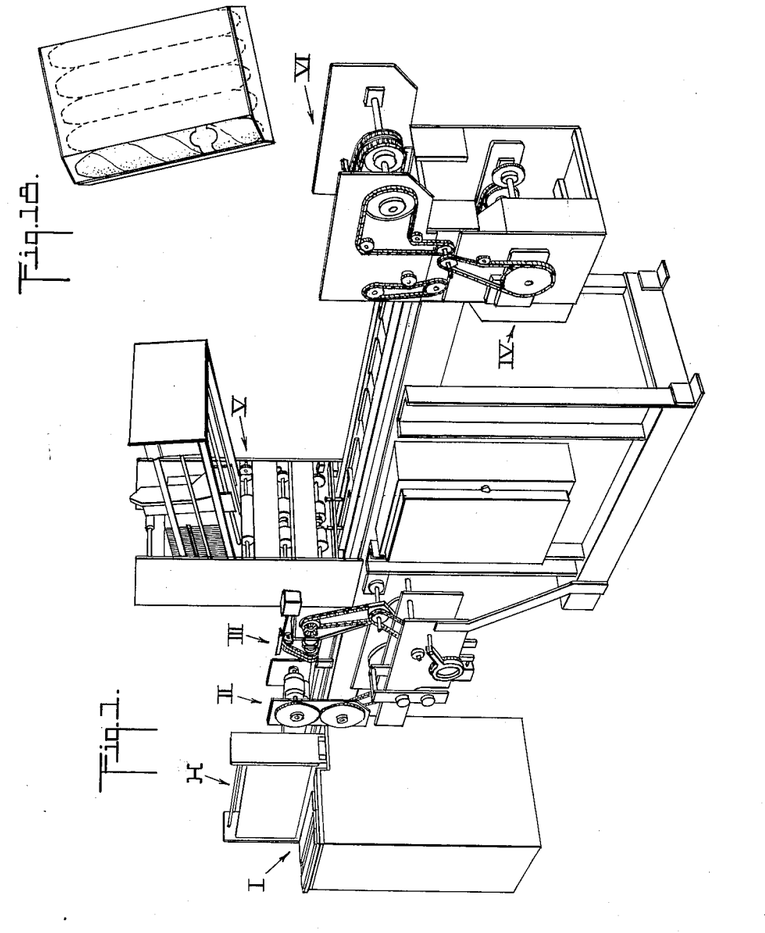
FIG. 1 is a perspective elevation of the machine embodying the invention.
Figure 2:
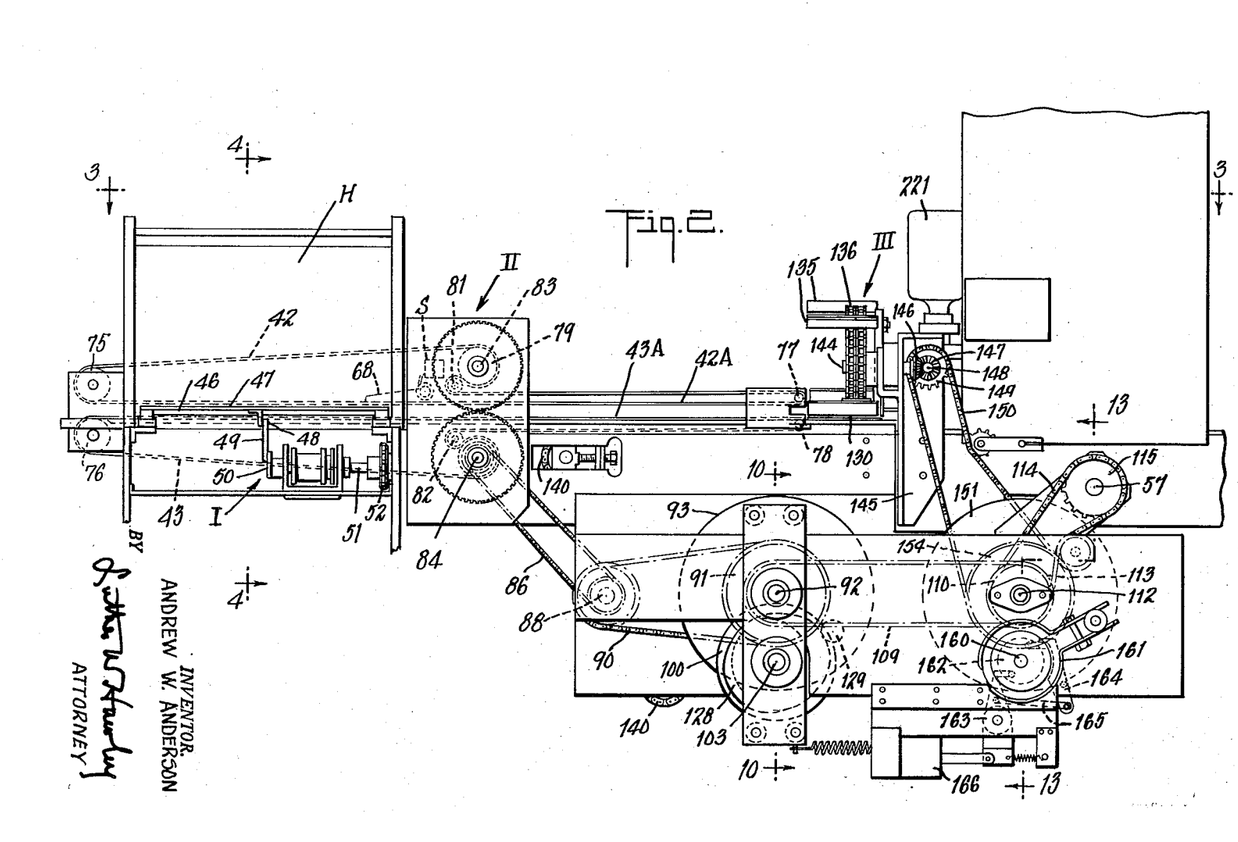
FIG. 2 is a vertical elevation, partly in section, of the feed belts and pusher mechanism, showing the driving connections therefor.
Figure 3:
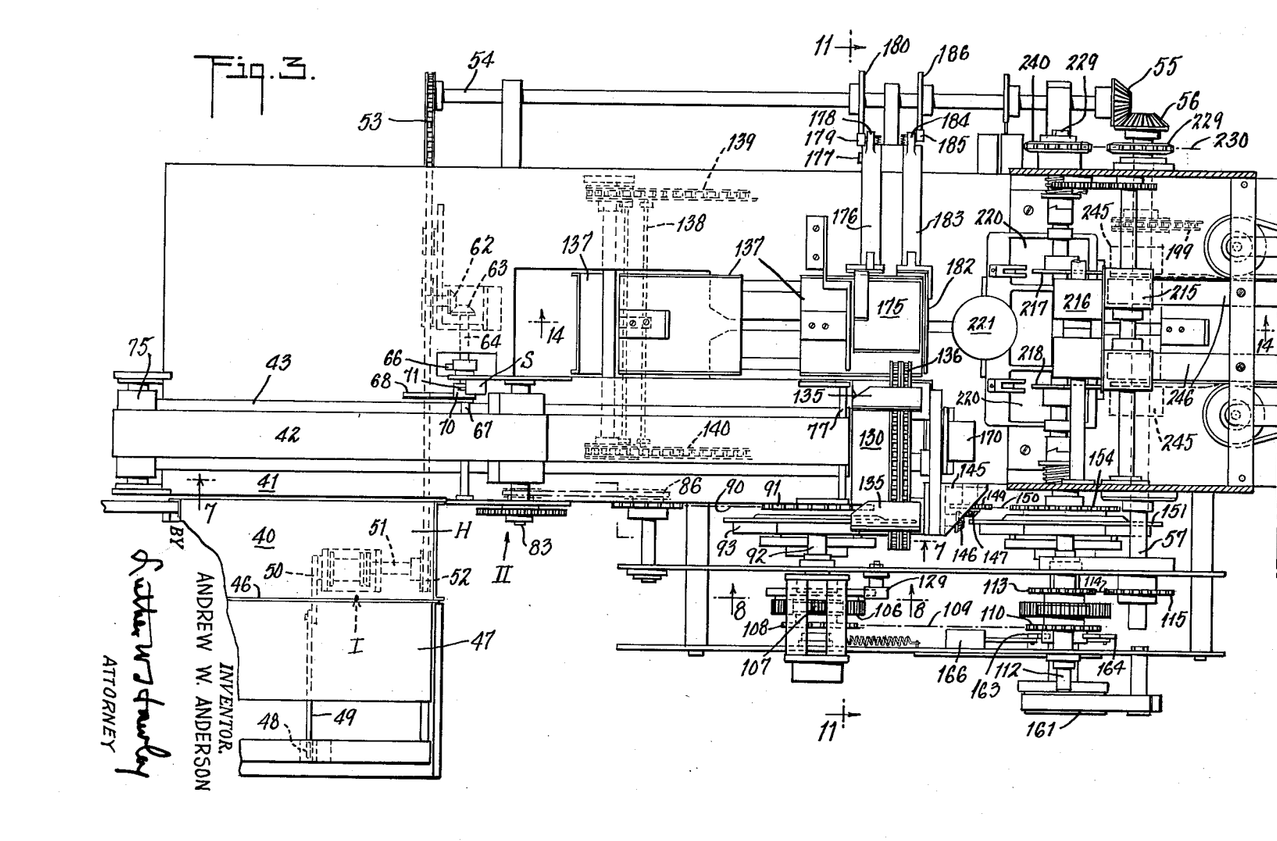
FIG. 3 is a top plan view of the structure shown in FIG. 2.
Figure 4:
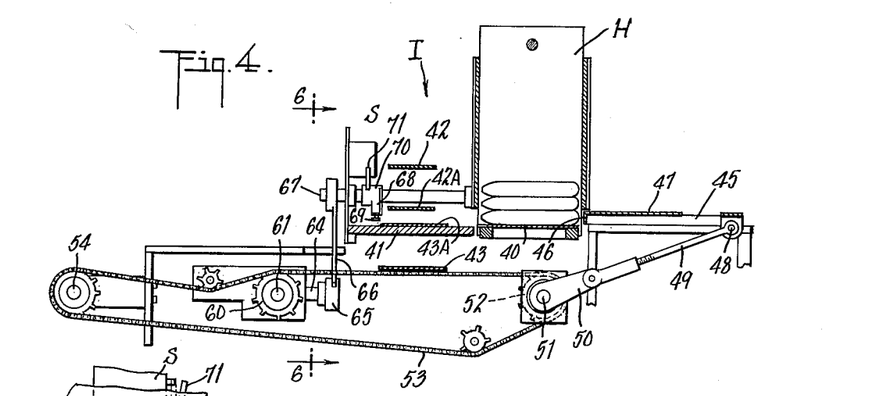
FIG. 4 is a vertical sectional elevation showing the pusher mechanism for pushing the cigars from the hopper onto the feed belts, the pusher mechanism being in retracted position.

This mechanism is illustrated particularly in FIGS. 2, 3, 7, 8, 9 and 10. The belts 42 and 43, as shown in FIG. 2, extend at one end around rollers 75 and 76 and at the other ends, or the delivery ends of the belts, around rollers 77 and 78. Intermediate their ends the belts extend around rollers 79 and 80 and rollers 81 and 82. The rollers 79 and 80 are mounted on spindles or shafts 83 and 84 and the shaft 84 has mounted thereon a sprocket wheel 85 which is driven by a chain 86, which in turn is driven by a sprocket 87 mounted on a spindle 88 which has also secured thereto a sprocket 89 driven by a chain 90 from a sprocket wheel 91 mounted on a shaft 92, to which is also secured a Geneva wheel 93. The Geneva driving mechanism is shown particularly in FIGS. 2, 7, 8 and 10.

The Geneva wheel 93 is of the common well-known construction and has four radiating slots 95, 96, 97 and 98, 90° apart or spaced at 90° around the axis or shaft 92.

Figure 10:
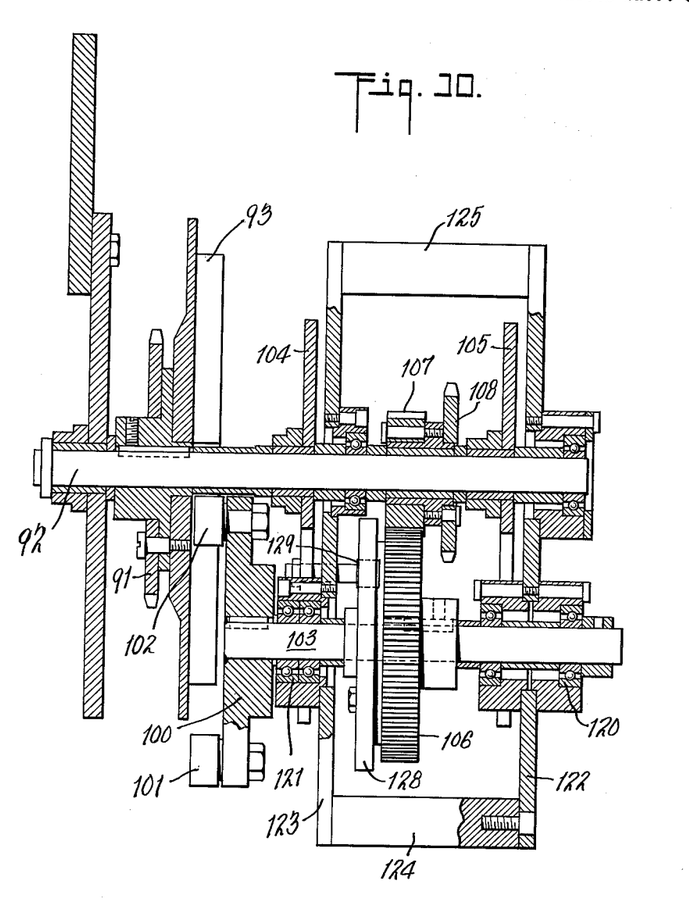
FIG. 10 is a sectional elevation taken substantially on line 10—10 of FIG. 2, looking in the direction of the arrows, this view showing the structure on an enlarged scale.
Figure 11:
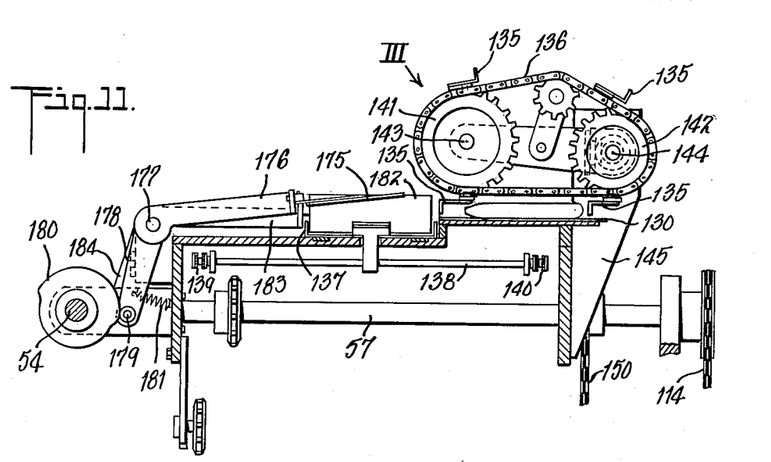
FIG. 11 is a sectional elevation taken substantially on line 11—11 of FIG. 3, looking in the direction of the arrows, this view showing the pushers for feeding the cigars to the mandrels and showing the operation before the cigars have been fed.

The Geneva wheel is driven by a Geneva plate 100 having mounted thereon rollers 101 and 102 which enter and leave the radiating slots in the Geneva wheel and rotate the wheel as the Geneva control plate 100 is rotated. The control plate 100 is mounted on a shaft 103 extending through slots and fixed frame walls 104 and 105, as shown in FIG. 10. The shaft 103 has secured thereto a spur gear 106 which meshes with a spur gear 107 mounted on the shaft 92 but rotatable thereon. The hub of the spur gear 107 has secured thereto a sprocket wheel 108, which is driven by a chain 109, which in turn is driven by a sprocket wheel 110 mounted on a sleeve 111 carried by a shaft 112. The sleeve 111 has also secured thereto a sprocket wheel 113, which is driven by a chain 114 from a sprocket wheel 115 mounted on the shaft 57 (see FIG. 13).

The shaft 103 of the Geneva index or control plate 100 is mounted in bearings 120 and 121 carried by a rectangular frame comprising plates or bars 122 and 123 connected by posts 124 and 125. The plates 122 and 123 are adapted to swing about the shaft 92 as an axis.

Figures 7, 8, 9:
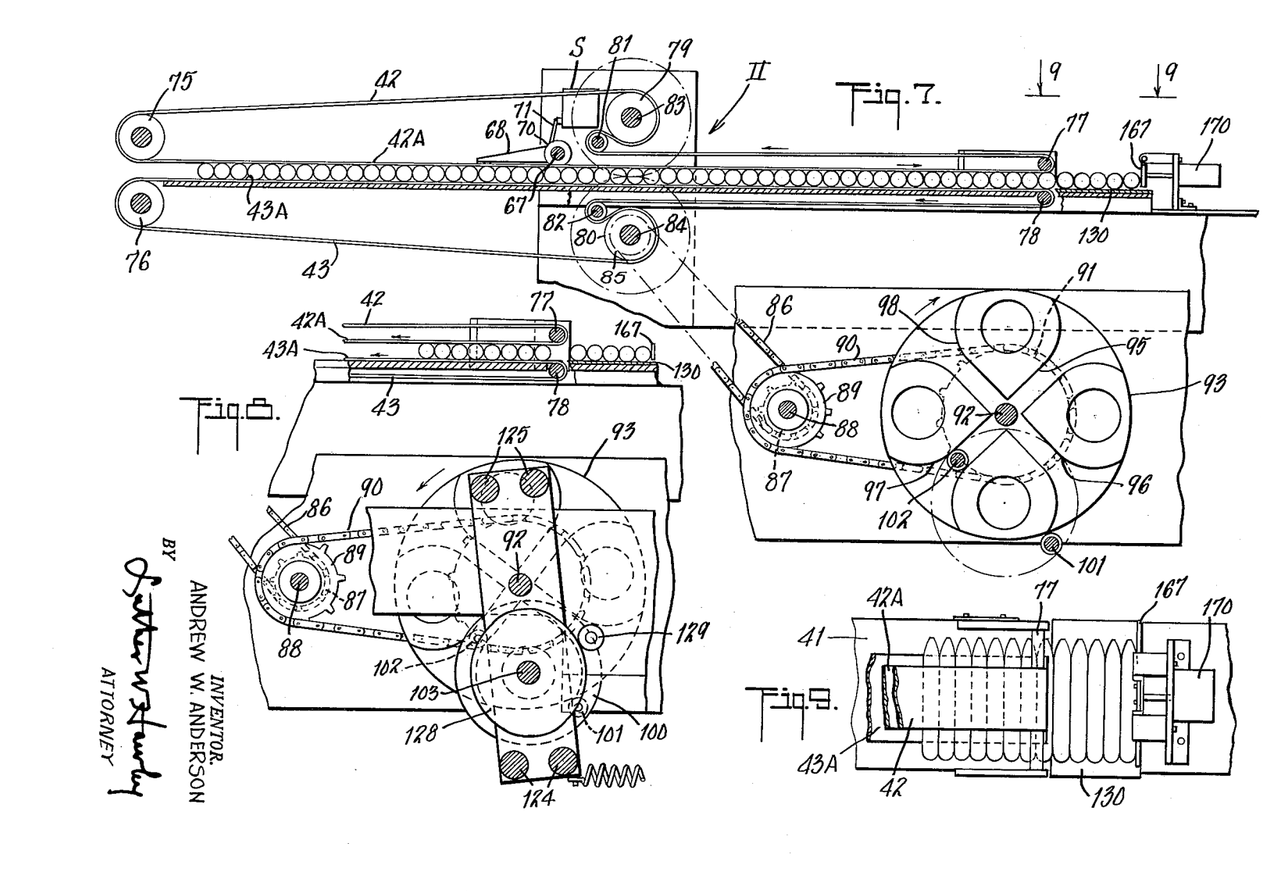
FIG. 7 is an elevational view of the feed belts and the platform which receives the cigars from the belts, this view showing a part of the mechanism for the belts and being taken substantially on line 7—7 of FIG. 3, looking in the direction of the arrows.
FIG. 8 is a vertical sectional elevation taken substantially on line 8—8 of FIG. 3, looking in the direction of the arrows, and showing the Geneva mechanism which controls the operation of the belts at the moment of reversal of the belts when cigars have been fed to a delivery platform, from which they are fed to the wrapping mechanism.
FIG. 9 is a plan view looking down on one end of the structure shown in FIG. 7, as indicated by the lines 9—9 on FIG. 7.

The shaft 103 has fixed thereon a cam 128, which is engaged by a roller or stud 129 mounted on the fixed frame member 104. The roller or stud 129 and cam 128 control the rotation of the Geneva control or index plate 100 during a portion of its revolution, so that the Geneva plate 93 which drives the belts 42 and 43 will be momentarily reversed, thus reversing the direction of drive of the belts, as shown in FIG. 8.

The belts 42 and 43 deliver the cigars side by side on a platform 130 disposed at the delivery end of the belts, and from this platform they are pushed in the manner about to be described into mandrels which feed them through the boxing and wrapping mechanism. In order to release the sidewise pressure on the cigars at the moment that they are pushed from the platform 130, the stud or roller 129, by coaction with the cam 128, will tilt the rectangular frame consisting of plates or bars 122 and 123, and this tilting movement causes the rollers 101 and 102 on the index plate 100 to reverse their direction in the slots in the Geneva plate 93. This will cause the Geneva plate momentarily to reverse its rotation, thereby momentarily reversing the belt drive and relieving the pressure on the cigars on the platform 130.

*Pusher Feed From Platform to Mandrels*

This mechanism is shown particularly in FIGS. 2, 3, 11, 12 and 13. As shown in FIG. 2, the cigars have been delivered by the belts 42 and 43 to the platform 130, from which they are fed by pusher lugs 135 carried by chains 136 to mandrels 137 which are mounted on rods 138 carried by conveyor chains 139 and 140.

The chains 136 are mounted on sprockets 141 and 142 mounted on spindles 143 and 144. The spindle 144 is carried by a fixed bracket 145 and is driven by a bevel gear 146 which meshes with a bevel gear 147 carried by a shaft 148. Shaft 148 has a sprocket wheel 149 secured thereto, which is driven by a chain 150, which in turn is driven by a Geneva wheel 151 mounted on the shaft 112. The Geneva wheel 151 is similar in construction to the wheel 100 shown in FIGS. 7 and 8 and is controlled by an index plate 152 which has studs or rollers 153 which engage the slots in the Geneva wheel. The hub of the Geneva wheel has mounted thereon a sprocket wheel 154 which drives the chain 150 before mentioned.

The index wheel 152 is mounted on a shaft 160, on one end of which is mounted a brake 161 which supplies friction and prevents back lash or reverse rotation of the shaft 160.

The shaft 160 has also mounted thereon a ratchet wheel 162 which is engaged by locking pawls 163 and 164 which are connected by a link 165 and are mounted on a solenoid 166 which is controlled by a swinging gate 167 (see FIGS. 7 and 9). When the cigars are fed on the platform 130, as shown in FIG. 7, the gate will be swung in an anticlockwise direction, thus closing a microswitch 170, which in turn controls the solenoid 166. This will cause the solenoid to release the locks on the Geneva index plate 152, thus permitting the index plate to rotate the Geneva wheel and actuate the pusher.

Figure 12:
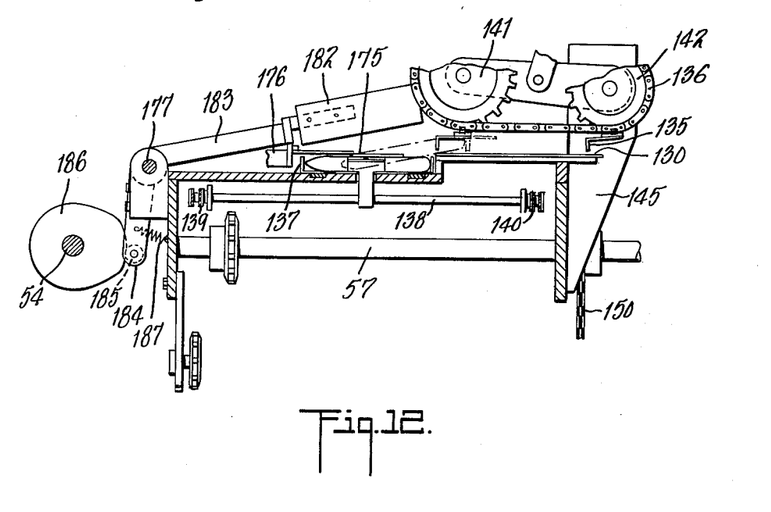
FIG. 12 is a view similar to FIG. 11 but showing the cigars after they have been fed by one of the pushers into the mandrel.
Figure 13:
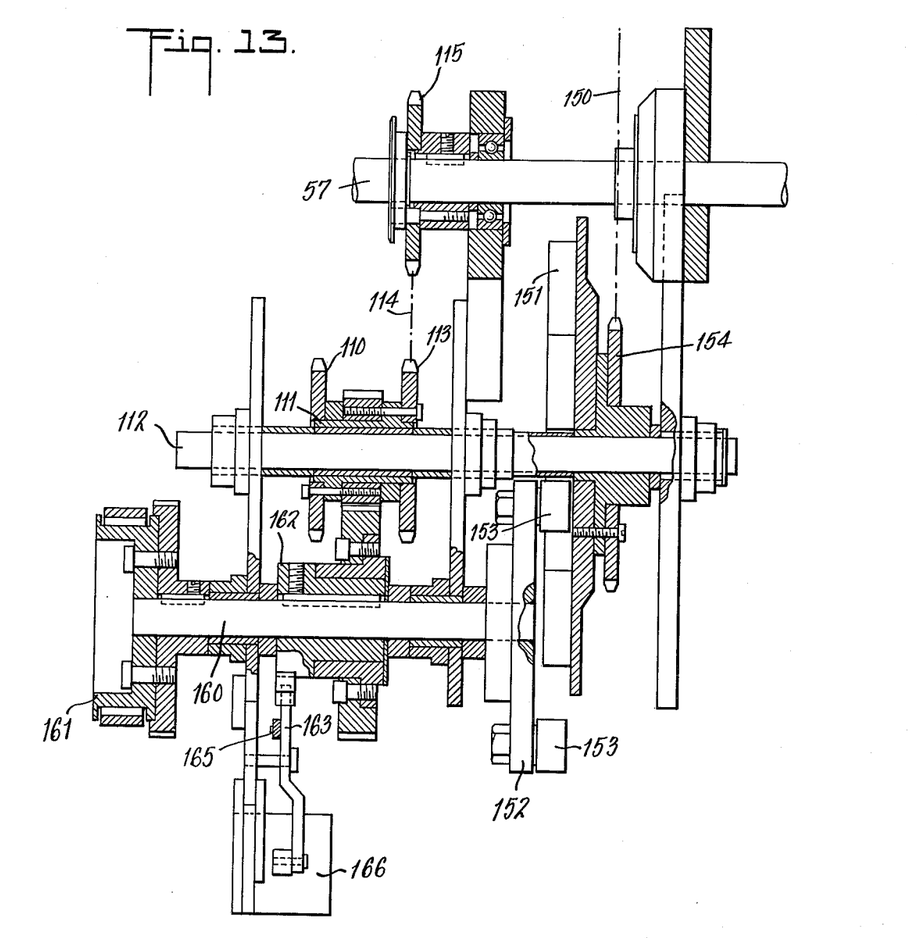
FIG. 13 is a vertical sectional elevation taken substantially on line 13—13 of FIG. 2, looking in the direction of the arrows.

After the cigars have been fed in the manner shown in dotted lines in FIG. 12 to the mandrel 137, they are gently pressed downwardly by a plate 175 carried by an arm 176 pivoted at 177. The arm 176 is actuated by an arm 178 which has a roller 179 controlled by a cam 180 on the shaft 54. A spring 181 normally holds the arm 176 in elevated position, but the cam is so designed that when the cigars have been fed over the mandrel, the plate 175 on the arm 176 is depressed to press the cigars down into the mandrel.

At the same time, a vertical plate 182 carried by an arm 183, also pivoted at 177, is depressed to close the front end of the mandrel 137 as the cigars are fed into the mandrel. The arm 183 is controlled by an arm 184 which has a roller 185 engaged by a cam 186 on the shaft 54. A spring 187 normally holds the plate 182 in elevated position. The parts just described are shown particularly in FIGS. 3, 11 and 12.

*Mandrel Operating Mechanism*

This structure is shown particularly in FIGS. 14, 15, 16, 22, 23, 25, 26, 27, 28 and 29. On FIG. 25 there is shown a shaft 190 which is driven from any suitable source of power. This shaft is connected by a chain 191 to drive a shaft 192, on which is mounted a spur gear 193 which meshes with a spur gear 194 loosely mounted on a shaft 195. The shaft 192 has secured thereto a Geneva index plate or control plate 196, which coacts with a Geneva wheel 197 rotatable on the shaft 195. The hub of the spur gear 194 has also mounted thereon a sprocket wheel 198, which is connected by a chain 199 to drive the shaft 57.

The Geneva wheel 197 has secured thereto a gear 187 which is also rotatable on shaft 195. Gear 187 meshes with a gear 188 on stub shaft 189, and gear 188 has pinned thereto and also mounted on stub shaft 189, a segmental gear 206 which has teeth on two 30° segments. The teeth on gear 206 mesh with a gear 207 fixed to shaft 195.

The Geneva control or index wheel 196 has rollers 208 which at times during the rotation of the index wheel 196 coact with Geneva wheel slots 209 to rotate the Geneva wheel.

The Geneva index wheel 196 also has a segment 222 which, at portions of the revolution of wheel 196, coacts with arcuate peripheral recesses 223 to lock the Geneva wheel. The Geneva index wheel 196 also has secured thereto and rotatable therewith, a segmental gear 224, which during 120° of the rotation of wheel 196, meshes with gear 207 on shaft 195. Thus, when the index wheel is not driving the shaft 195 through the Geneva wheel and its gear train, the Geneva wheel 197 is held locked by the segment 222.

Figures 14, 15, 16, 17:
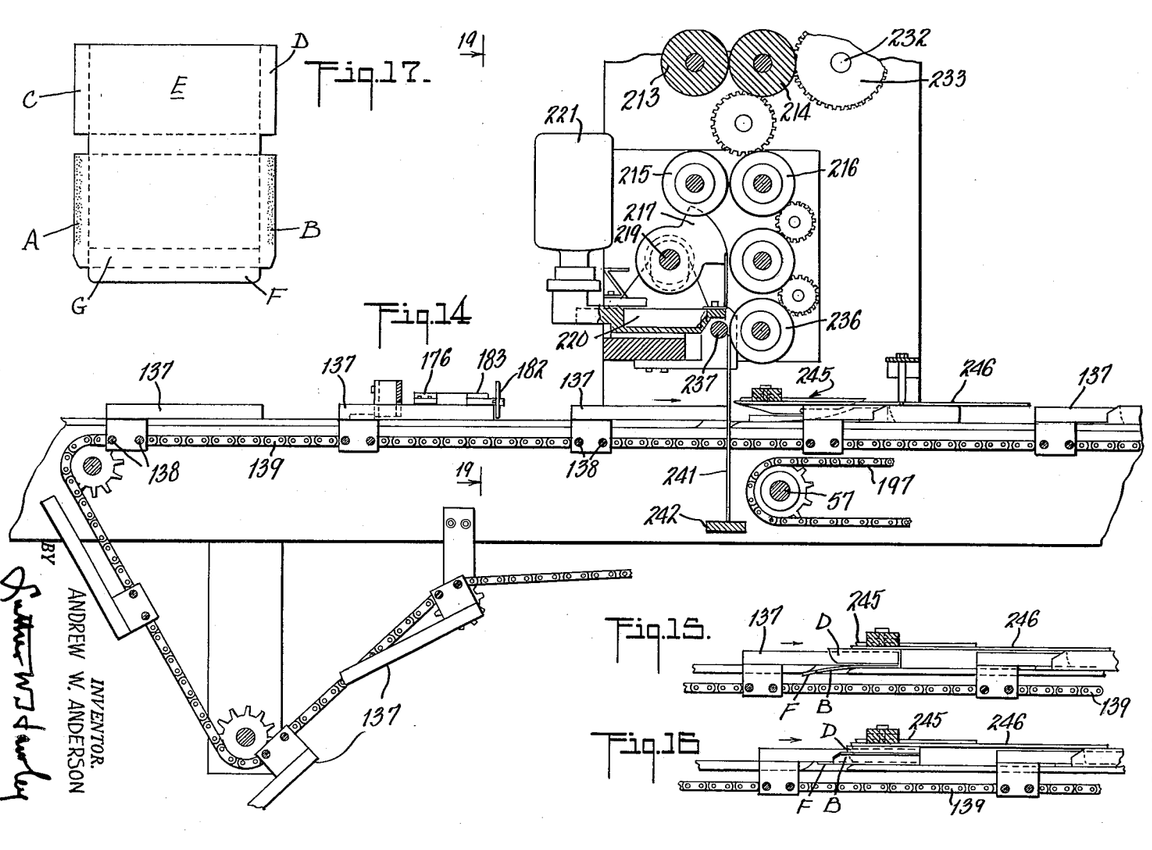
FIG. 14 is a vertical sectional elevation showing the feeding mechanism for the blank, the feeding mechanism for the chains which carry the mandrels, and a portion of the folding mechanism.
FIG. 15 is an elevational view of a portion of FIG. 14 illustrating the folding operation.
FIG. 16 is a view similar to FIG. 15 but showing the mandrel and carton blank around the mandrel in a later position of movement in which the end flaps have been folded and the carton and contents are in a position for the operation of the stripping mechanism.
FIG. 17 is a plan view of the blank.
Figure 30:
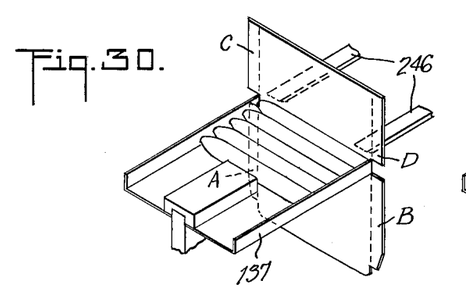
FIG. 30 is a perspective elevational view showing one of the mandrels in the position taken when it contacts the blank and just prior to the folding of the blank around the mandrel.
Figure 31:
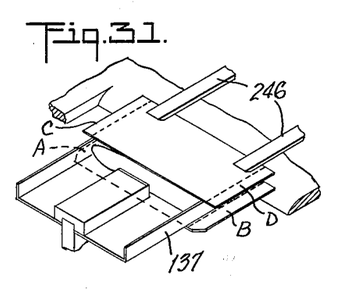
FIG. 31 is a perspective elevational view similar to FIG. 30, this view illustrating the blank folded around the advance end and top and bottom of the mandrel.
Figure 32:
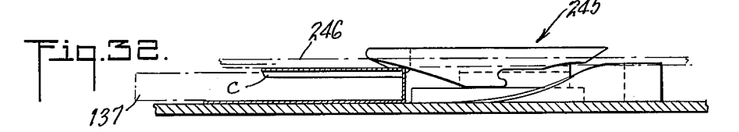
FIG. 32 is a sectional elevation showing the mechanism for folding the flaps of the blank.
Figure 33:
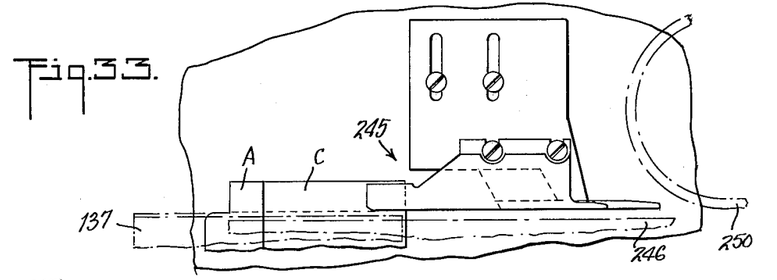
FIG. 33 is a plan view of the structure shown in FIG. 32.
Figure 34:
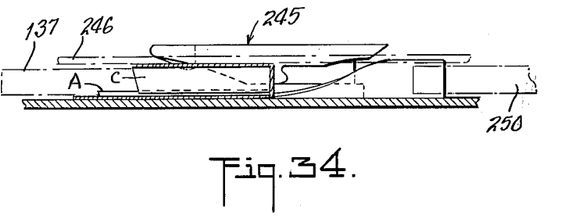
FIG. 34 illustrates the mandrel with the blank folded around the mandrel passing through the folding mechanism.
Figure 35:
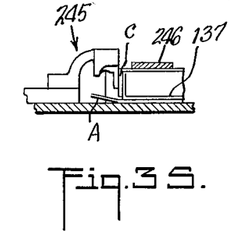
FIG. 35 is a detail elevational view taken at right angles to FIG. 34.

The shaft 195 has a sprocket wheel 200 which is connected by a chain 201 to a sprocket wheel 202 mounted on a shaft 203, on which are mounted sprockets 204 and 205 which drive the conveyor chains 139 and 140 on which the rods 138 of the mandrels 137 are mounted. It will be understood that the conveyor chains 139 and 140 are led around suitable idler sprockets which guide the chains in such a manner that they will feed the mandrels in the manner shown in FIGS. 3 and 14 in a path in which they contact a carton blank and feed the blank through suitable folding mechanism which folds the blank across the top and bottom of the mandrel and closes the ends thereof, as shown in FIGS. 30 and 31. Idler sprockets which perform this function are shown in FIG. 14 and need not be described in detail. It will be understood without further description that the mandrels will be fed intermittently by the Geneva wheel 197 and other gearing controlled by the Geneva index wheel.

*Blank Feed*

This mechanism is shown particularly in FIGS. 14, 17, 19, 20 and 21. The blank feed will be described briefly and without going into great detail since no novelty is claimed in the blank feeding mechanism.

The blanks are supported in a hopper 210 of the usual construction and are engaged by suction cups 211 mounted on a frame and are moved into feeding position between a pair of feed rollers 213 and 214. From the feed rollers 213 and 214 the blank passes downwardly between feed rollers 215 and 216. Below these feed rollers the edge flaps A and B of the blank (see FIG. 17) are engaged by disk segments 217 and 218 mounted on a shaft 219 and adapted to pick up adhesive from a receptacle 220 during the rotation of the shaft. The adhesive is stored in a supply tank 221 and flows into the receptacle 220 therefrom.

Figures 19, 20, 21:
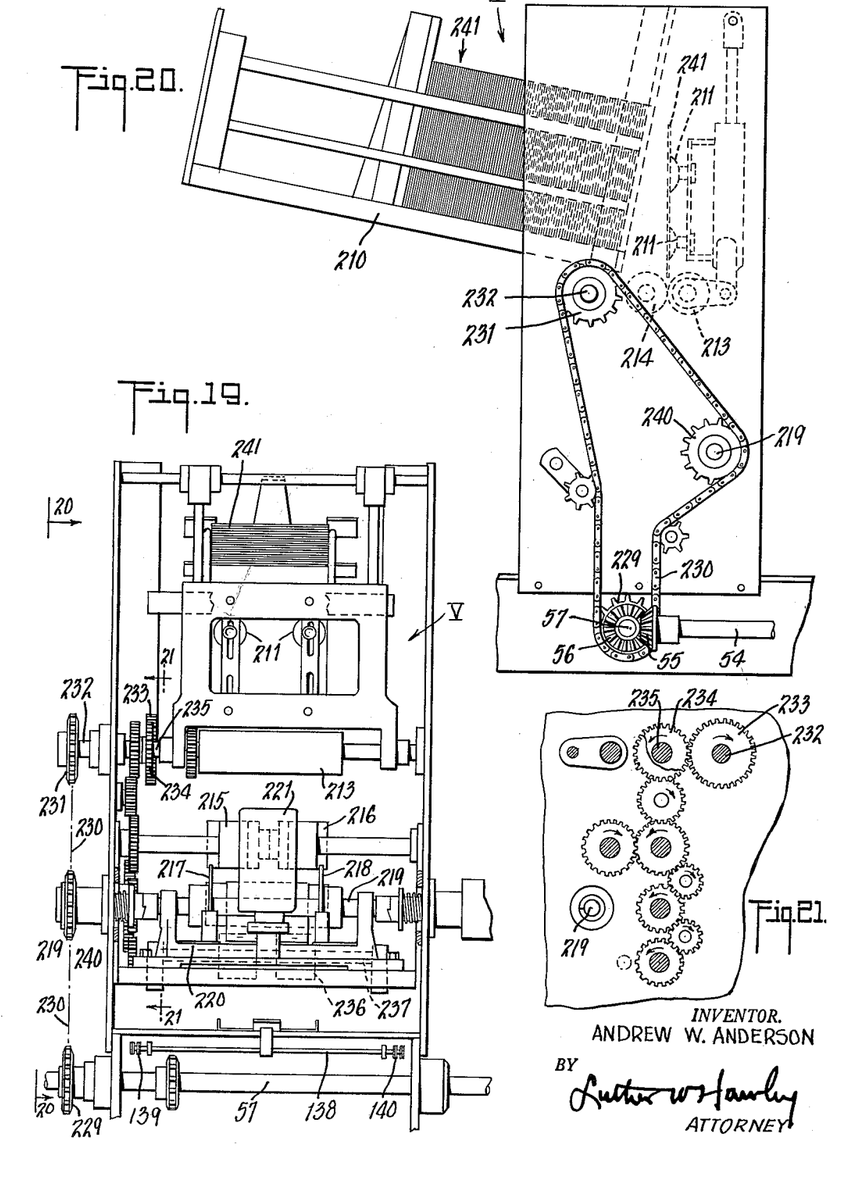
FIG. 19 is a plan view of the portion of the machine in which the carton blank is fed downwardly into the path of movement of the mandrels.
FIG. 20 is an elevational view looking in the direction of the arrow 20 in FIG. 19.
FIG. 21 is a sectional elevation taken substantially on line 21—21 of FIG. 19, looking in the direction of the arrows.
Figure 22:
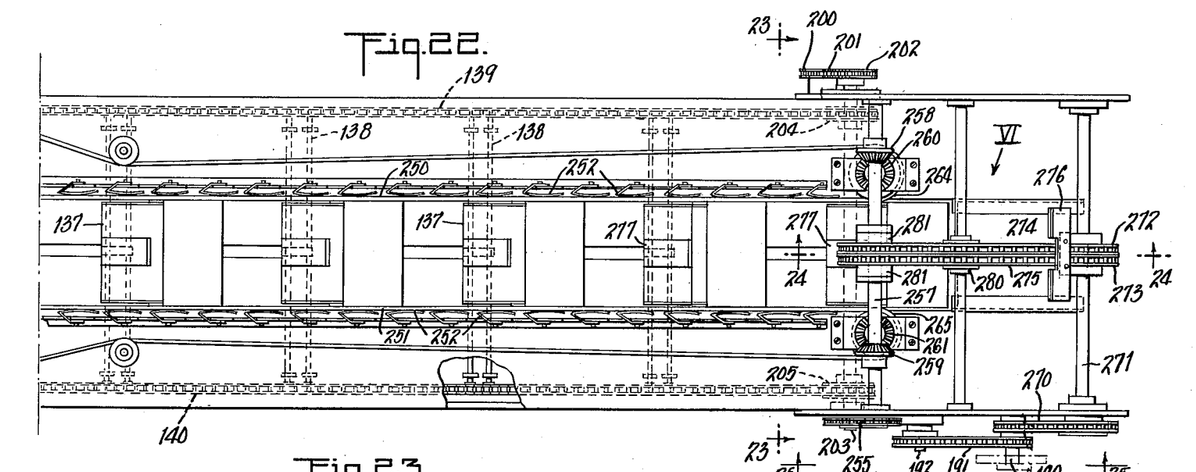
FIG. 22 is a plan view of the mandrels having the carton thereon and of the pressure belt which holds the sealed ends of the cartons in sealing position, this view showing also the stripping mechanism for stripping the cartons and contents from the mandrels.
Figure 23:
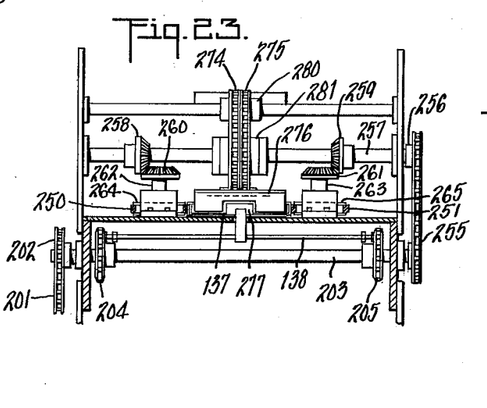
FIG. 23 is a sectional elevation taken substantially on line 23—23 of FIG. 22, looking in the direction of the arrows.
Figure 24:
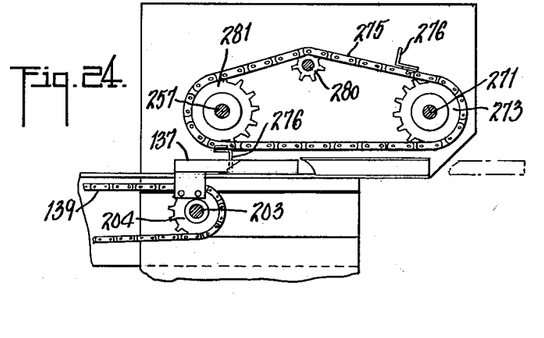
FIG. 24 is a sectional elevation taken substantially on line 24—24 of FIG. 22, looking in the direction of the arrows.

The driving connections for the feed rollers which feed the carton blank downwardly into the path of the mandrels are shown in FIG. 20. This figure shows at the bottom, the shaft 54 which is connected through the bevel gears 55 and 56 driven by the shaft 57 on which is mounted a sprocket 229 which drives a chain 230. This chain drives the sprocket 231 on a shaft 232. The shaft 232 has a spur gear 233 which drives a spur gear 234 on a shaft 235 on which the roller 214 is mounted. The feed rollers 215 and 216 are also driven by spur gear driving connections, which will not be described in detail, and a train of spur gears is also connected to drive a feed roller 236 which coacts with a roller 237. The shaft 219 which carries the adhesive applying segmental disks has mounted thereon a sprocket wheel 240 which is driven by the chain 230 in the manner shown in FIG. 20.

When the carton blank 241 is fed downwardly by the feed rollers above described, it rests on a stop 242 in the path of movement of the mandrels 137. As the blank is engaged by the mandrel, it will be folded over the top and bottom of the mandrel and then is fed through suitable well-known folding mechanism shown at 245 in FIG. 14. This folding mechanism, in the usual manner, folds the flaps C and D of the blank downwardly, and thereafter folds the flaps A and B upwardly outside of the flaps C and D. It will be understood that these flaps are folded downwardly against the walls of the mandrels within which the cigars have been deposited and the flaps will be held in position, initially, by plates 246.

After the flaps of the blanks have been folded in the manner described, the blanks and mandrels are fed between pressure belts 250 and 251, which are pressed inwardly against the folded flaps by springs 252. The belts 250 and 251 are driven by a sprocket mounted on shaft 203 which drives a chain 255, which in turn drives sprocket 256 on shaft 257. Bevel gears 258 and 259 on shaft 257 drive bevel gears 260 and 261 mounted on stub shafts 262 and 263, on which in turn are mounted pulleys 264 and 265 which impart to belts 250 and 251 the same intermittent movement as supplied to the mandrels. It will be understood that the other ends of the belts are mounted on suitable idler pulleys and that the inner laps of the belts engage the folded flaps and hold the flaps A and B, on which adhesive has been deposited, in sealing engagement with the flaps C and D. The folding mechanism above briefly described is further illustrated in FIGS. 32 to 35 inclusive but since no novelty is claimed in this mechanism further detailed description is not deemed necessary.

*Stripper Mechanism*

Figure 25:
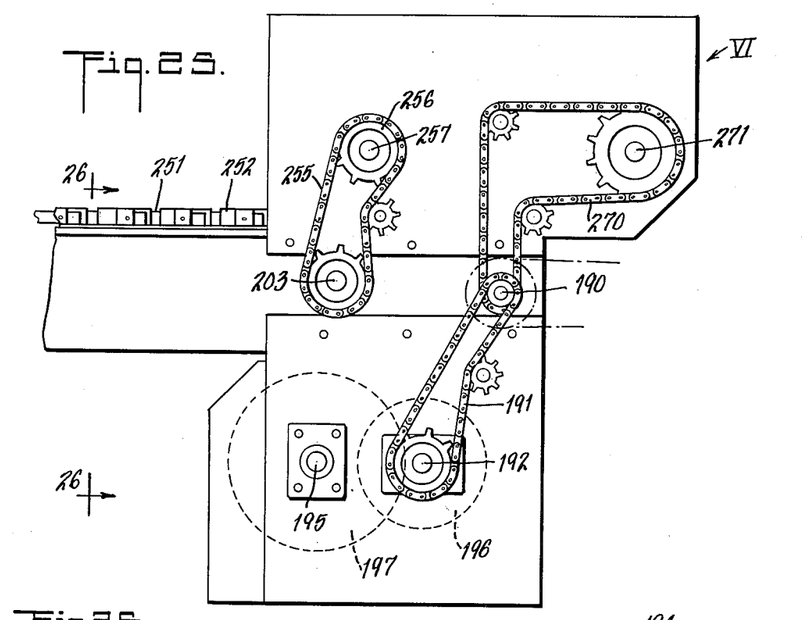
FIG. 25 is an elevational view showing the driving connections for the stripping mechanism.
Figures 26, 27:
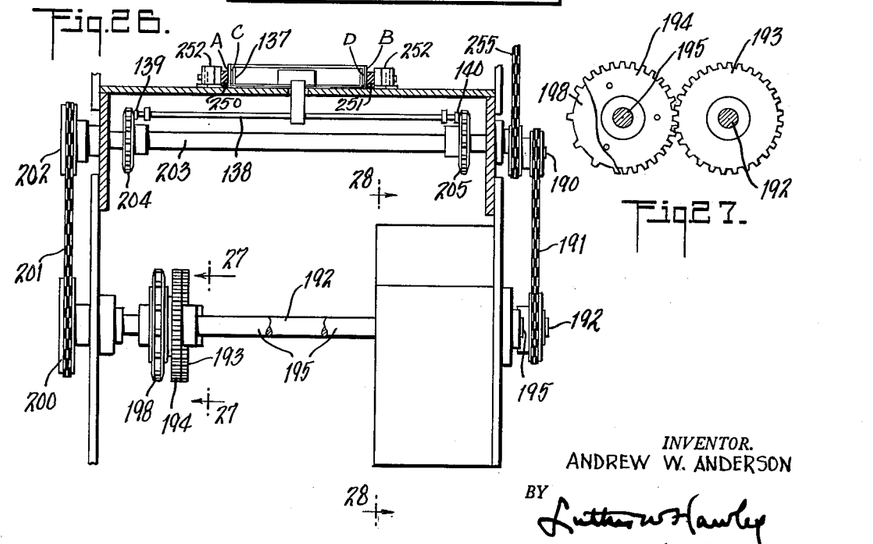
FIG. 26 is a view at right angles to FIG. 25 taken in the direction of the arrow 26 on FIG. 25.
FIG. 27 is a sectional elevation taken substantially on line 27—27 of FIG. 26, looking in the direction of the arrows.
Figure 28:
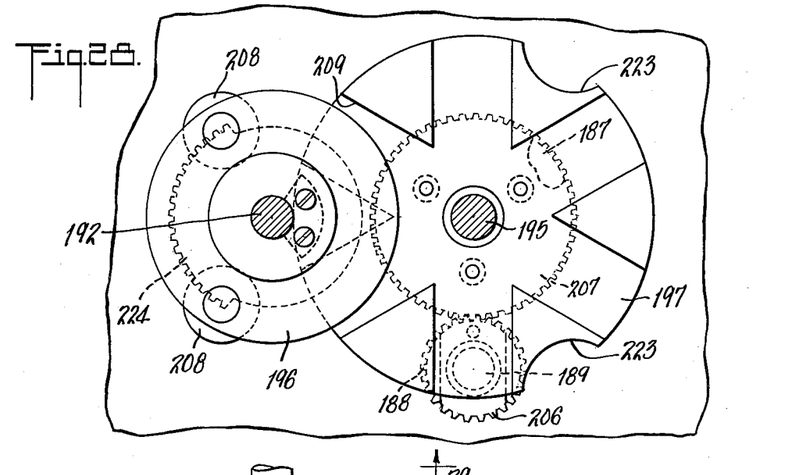
FIG. 28 is a sectional elevation taken substantially on line 28—28 of FIG. 26, looking in the direction of the arrows, showing the Geneva mechanism for driving the mandrel conveyor chains.
Figure 29:
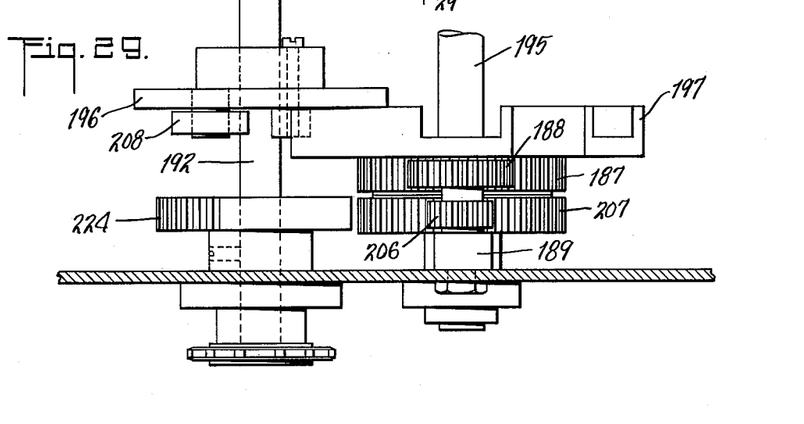
FIG. 29 is a bottom plan view of the structure shown in FIG. 28, looking in the direction of the arrow 29 on FIG. 28.

This mechanism is illustrated particularly in FIGS. 22, 23, 24, 25, 26 and 27. After the blanks have been folded and sealed around the mandrels, the cartons and contents thereof are stripped from the mandrels in the manner shown in the figures above identified. As shown in FIG. 25, the shaft 190 drives a chain 270. This chain drives a shaft 271, on which are mounted sprockets 272 and 273, on which are mounted chains 274 and 275 having secured thereto lugs 276. The lugs 276 are shaped in the manner shown in FIG. 23 so as to straddle the lugs 277 which project upwardly from the mandrels 137. The chains 274 and 275 are guided around idler sprockets 280 and end sprockets 281 which are disposed in the plane of the sprockets 272 and 273.

As the chains are driven in the manner described, the ejector lugs 276 will engage the cigar outside the open ends of the carton and eject the cartons from the mandrels. After the cartons are thus ejected, they are fed to suitable wrapping mechanism which has not been illustrated since it forms no part of the present invention.

It will be noted that in the box shown in FIGS. 18 and 31 the outer cigar is not disposed beneath the upper cover E of the box blank, but rests on the lower end flap F. The package is wrapped to enclose the box and the outer cigar, but when the package is opened and the outer cigar is removed, the flap F can be folded and the tab G will hold the box closed with the remaining cigars therein.

From the foregoing specification it will be evident that the mechanism described will operate efficiently to feed and box cigars. The cigars will be intermittently fed by controlled feeding means between the continuously operating feed belts. From the platform on which they are deposited by the belts, they will be intermittently fed to the mandrels after a predetermined number of cigars are deposited on the platform.

The mandrels will be at rest when the cigars are deposited therein and when the completed boxes and contents are ejected therefrom. Between the periods of rest the mandrels will be moved by the Geneva mechanism described through their path of movement to engage the carton blanks, and thence through the folding mechanism to the ejecting mechanism. By means of the Geneva movement which is connected to the conveyor chains on which the cartons are supported, for each revolution of the shaft 195 the shaft will be accelerated for 60°, driven at constant speed for 120°, decelerated for 60°, and will remain at rest for 120°.

The completed cartons and contents will be stripped from the mandrels intermittently and will thereafter be conducted to suitable wrapping mechnaism.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A cigar packaging machine comprising means, including a pair of parallel belts, for feeding the cigars, side by side, means for receiving the cigars from said belts and for feeding the cigars longitudinally in groups at right angles to the initial feeding means, and means for temporarily reversing the feeding belts during the second named feeding movement.

2. A cigar packaging machine comprising means for feeding the cigars, side by side, a plurality of mandrels, means for feeding the mandrels, means for receiving the cigars from the first named feeding means and for feeding the cigars to said mandrels in groups at right angles to the initial feeding means, and means for temporarily reversing the first named feeding of the cigars during the second named feeding movement.

3. A cigar boxing machine comprising means for feeding the cigars, side by side, a plurality of mandrels, means for feeding the mandrels, means operating at right angles to the first named feeding means for receiving the cigars from the first named feeding means and feeding the cigars in groups to the mandrels, means for temporarily reversing the first named feeding movement of the cigars during the second named group feeding movement, means for feeding box blanks into the path of movement of the mandrels, and means for folding and sealing the blanks around the mandrels and cigars therein.

4. A cigar boxing machine comprising means, including a pair of parallel belts, for feeding the cigars, side by side, a plurality of mandrels, means for feeding the mandrels, means operating at right angles to the first named feeding means for receiving the cigars from the first named feeding means and feeding the cigars in groups to the mandrels, means for feeding box blanks into the path of movement of the mandrels, means for folding and sealing the blanks around the mandrels and cigars therein, pressure belts on the sides of the path of movement of the mandrels and folded blanks, and means driven from the mandrel feed for driving the pressure belts in synchronism with the mandrel feed.

5. A cigar boxing machine comprising means for feeding the cigars, side by side, means for feeding groups of cigars to said first named feeding means, a plurality of mandrels, means for feeding the mandrels, means operating at right angles to the first named feeding means for receiving the cigars from the first named feeding means and feeding the cigars in groups to the mandrels, and means in the path of the cigars fed by the first named feeding means for controlling the means for feeding the groups of cigars to the first named feeding means.

6. A cigar boxing machine comprising means for feeding the cigars, side by side, a plurality of mandrels, means for feeding the mandrels, means operating at right angles to the first named feeding means for receiving the cigars from the first named feeding means and feeding the cigars in groups to the mandrels, means for temporarily reversing the first named feeding means during the operation of the right angle feeding means, and means engageable with the cigars fed to the mandrels for pressing the cigars downwardly in the mandrels.

References Cited in the file of this patent

UNITED STATES PATENTS

| | | |
|---|---|---|
| 1,110,125 | Giroud | Sept. 8, 1914 |
| 2,019,080 | Johnson et al. | Oct. 29, 1935 |
| 2,095,938 | Schmitt | Oct. 12, 1937 |
| 2,142,271 | Herrmann | Jan. 3, 1939 |
| 2,550,616 | Stephano | Apr. 24, 1951 |
| 2,587,959 | Biner | Mar. 4, 1952 |
| 3,014,321 | Lesch | Dec. 26, 1961 |